United States Patent [19]

Johnson

[11] Patent Number: 4,752,050
[45] Date of Patent: Jun. 21, 1988

[54] APPARATUS FOR SIMULTANEOUSLY DISREEFING A CENTRALLY REEFED CLUSTERED PARACHUTE SYSTEM

[75] Inventor: Donald W. Johnson, Albuquerque, N. Mex.

[73] Assignee: The United States of America as represented by the United States Department of Energy, Washington, D.C.

[21] Appl. No.: 922,425

[22] Filed: Oct. 23, 1986

[51] Int. Cl.⁴ ............................................. B64D 17/36
[52] U.S. Cl. ..................................... 244/152; 244/149
[58] Field of Search ................... 244/151.13, 152, 149

[56] References Cited

U.S. PATENT DOCUMENTS

| | | | |
|---|---|---|---|
| 2,421,167 | 5/1947 | Smith | 244/142 |
| 2,520,931 | 9/1950 | Heinrich | 244/152 |
| 3,245,639 | 4/1966 | Mitchell | 244/152 |
| 3,385,539 | 5/1968 | Ewing | 244/142 |
| 3,388,879 | 6/1968 | Pisano et al. | 244/152 |
| 3,408,026 | 10/1968 | Kriesel | 244/152 |
| 3,423,054 | 1/1969 | Stencel | 244/149 |
| 3,452,631 | 7/1969 | Brizzolara | 83/444 |
| 3,780,970 | 12/1973 | Pinnell | 244/152 |

FOREIGN PATENT DOCUMENTS 1410563  8/1965  France ................................ 244/152

OTHER PUBLICATIONS

W. J. Everett et al., "Recovery of 60,000 Lbs. Using a Cluster of Six 137 Ft. Dia. Parachutes", AIAA 8th Aerodynamic Decelerator and Balloon Tech. Conf., AIAA Paper 84-0800-CP, Hyannis, MA, Apr. 2-4, 1984.

R. W. Rodier et al., "136-Foot Main Parachute for Recovery of Space Shuttle Solid Rocket Boosters", AIAA 8th Aerodynamic Decelerator & Balloon Tech. Conf., AIAA Paper 84-0804-CP, Hyannis, MA, Apr. 2-4, 1984.

Johnson, Donald W., "F/FB111 Crew Module Recovery Parachute Redesign Feasibility Study Report", Sandia Report, SAND 85-0468, May 1985.

Primary Examiner—Galen Barefoot
Assistant Examiner—Rodney Corl
Attorney, Agent, or Firm—Anne D. Daniel; James H. Chafin; Judson R. Hightower

[57] ABSTRACT

A single multi-line cutter is connected to each of a cluster of parachutes by a separate short tether line that holds the parachutes, initially reefed by closed loop reefing lines, close to one another. The closed loop reefing lines and tether lines, one from each parachute, are disposed within the cutter to be simultaneously cut by its actuation when a central line attached between the payload and the cutter is stretched upon deployment of the cluster. A pyrotechnic or electronic time delay may be included in the cutter to delay the actual simultaneous cutting of all lines until the clustered parachutes attain a measure of stability prior to being disreefed. A second set of reefing lines and second tether lines may be provided for each parachute, to enable a two-stage, separately timed, step-by-step disreefing.

16 Claims, 2 Drawing Sheets

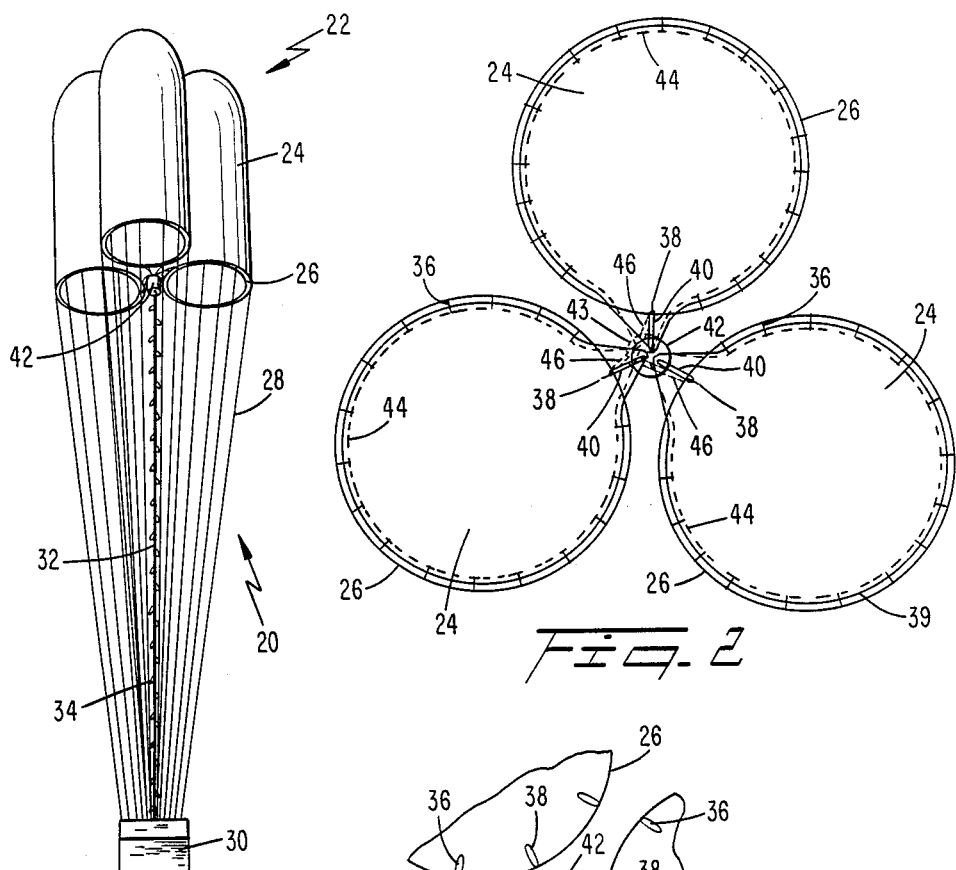
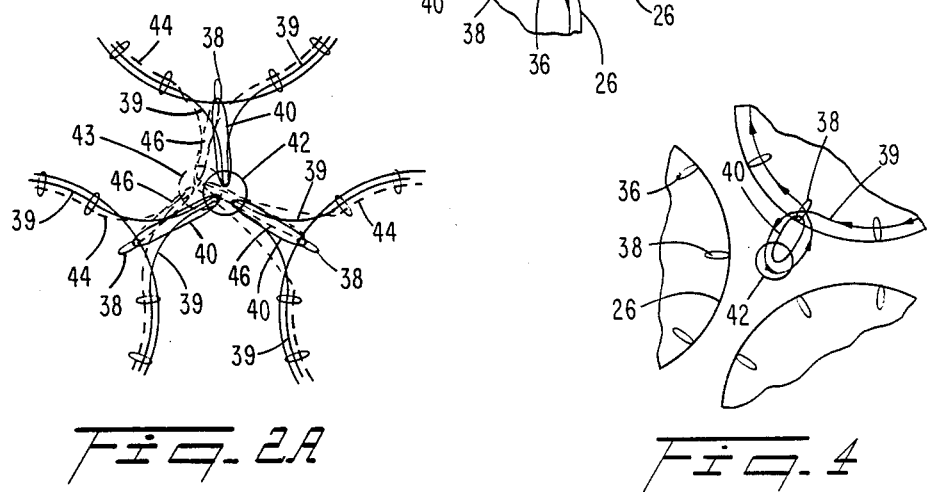

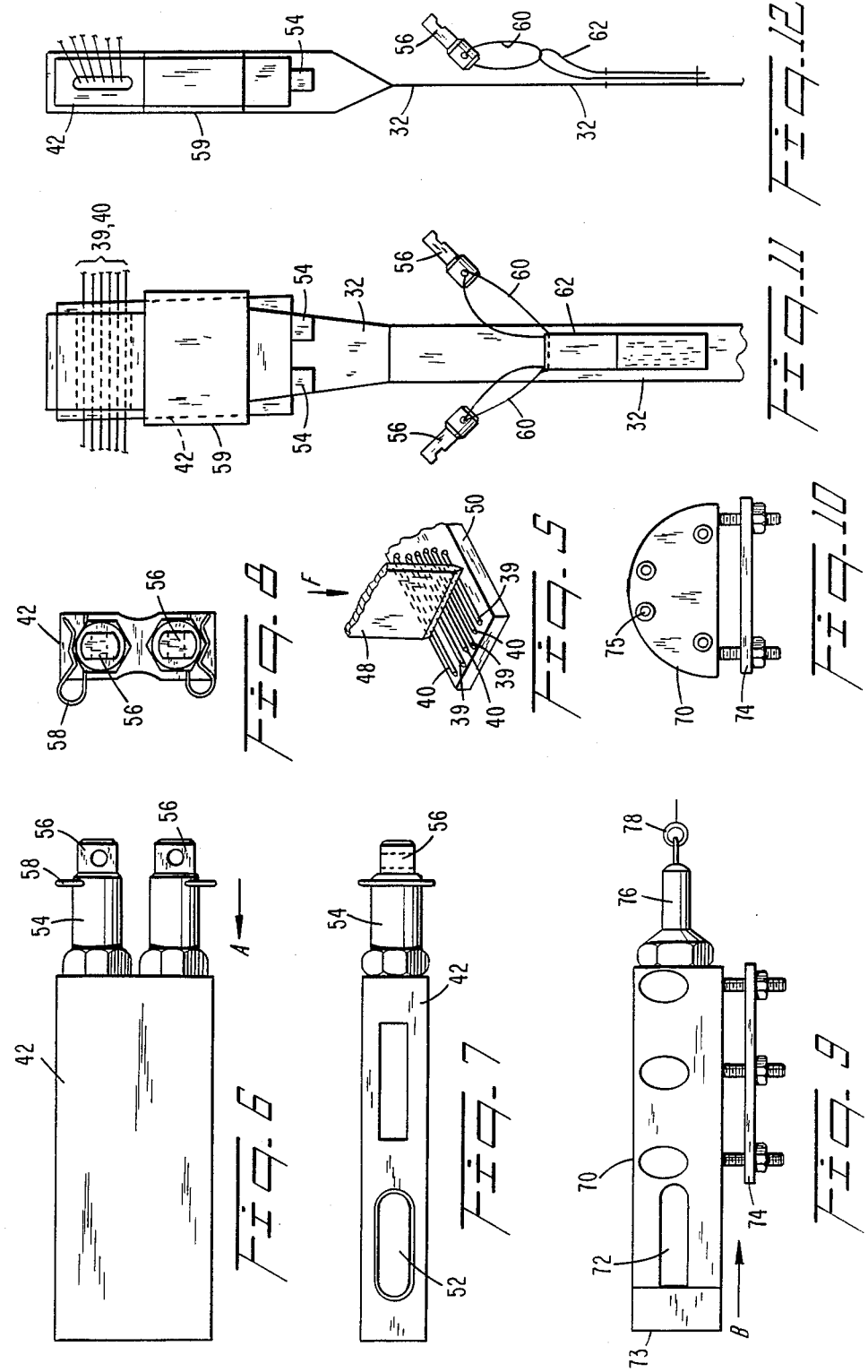

APPARATUS FOR SIMULTANEOUSLY DISREEFING A CENTRALLY REEFED CLUSTERED PARACHUTE SYSTEM

The U.S. Government has rights in this invention pursuant to Contract No. DE-AC04-76DP00789 between the U.S. Department of Energy and AT&T Technologies, Inc.

BACKGROUND OF THE INVENTION

1. Field of the Invention

This invention relates generally to apparatus which permits disreefing of line-reefed parachutes in a clustered parachute system and, more particularly, to apparatus for simultaneous disreefing of all parachutes in a cluster.

2. History of the Prior Art

The early stages of deployment of any parachute or cluster of parachutes involve unsteady aerodynamics, and consequent unsteady loading of the lines between the parachute and the load. A principal advantage is the faster inflation rate for a cluster of smaller parachutes, since the "apparent mass" of a cluster of smaller parachutes is smaller than the "apparent mass" of an equivalent large single parachute. Therefore, a clustered parachute system, with rapid inflation of each parachute in the cluster, is preferable for applications in which large drag areas must become effective very rapidly after deployment. It is very important, however, to obtain simultaneous inflation of each parachute in the cluster and even distribution among all the parachutes in the cluster of the load-supporting drag force produced by the entire clustered parachute system. Reefing is a means by which the parachutes, when initially deployed, are limited in the extent to which they can open until a certain degree of inflation stability and load control have been obtained. Reefing is provided by passing a frangible line through rings attached to the periphery of each parachute. The reefing line has a length less than that of the periphery in its fully deployed state so that the parachutes fill up with air after deployment but are not free to open fully to exert their maximum drag force on the load. After stability is attained by the line-reefed parachutes, their reefing lines are cut to permit the parachutes to open up further and exert even larger drag forces on the load suspended below.

If the reefing lines are not all cut at the same time, the parachutes will not inflate simultaneously. This will allow one or more of the parachutes to inflate earlier, generating more than an appropriate share of the total drag force applied to the load. To avoid catastrophic failure of the lines or of the fabric of any parachute that inflates too early, it therefore becomes necessary to overdesign each of the parachutes. Since such overloads last for relatively short times, such overdesigning is expensive and adds undesirable weight to the system as a whole. Furthermore, those parachutes which lag in the inflation process generally will not inflate until several seconds later which causes the drag area and hence the drag force produced early in the deployment process to be lower than expected so that the payload does not decelerate as desired.

A clustered parachute system typically is deployed from a deployment bag attached to the falling load. Upon deployment, the cluster of parachutes is presented to the air stream in a random manner, causing corresponding random inflation of the individual parachutes. Even if reefing of the parachutes is not required to control the development of drag force of each parachute, short time delay reefing can be used to initialize the opening of the skirt of each canopy in a symmetric manner.

As noted earlier, at an appropriate time, each parachute is disreefed, generally by a cutting element severing one or more lines upon command. It is common practice to provide individual pyrotechnic delays to reefing line cutters which are actuated when the load lines connecting the parachutes to the payload reach their full stretch. Such pyrotechnic time delay systems have a 20–30% tolerance in the time delay provided, causing nonsimultaneous inflation of the parachutes of the cluster.

One solution, offered in U.S. Pat. No. 3,780,970 to Pinnell, teaches the use of a generally triangularly-shaped web, located centrally of the parachutes in the cluster, to provide control of the parachute skirts during the reefing stage. Some of the parachute reefing rings of each parachute are held together by the web assembly to limit the opening of the parachute skirt. Since part of each parachute periphery is reefed while the rest of the parachute is allowed to inflate, this causes asymmetric loading. Where high performance is needed, generally in highly loaded parachute systems, such asymmetric loading will cause failure of individual parachutes and thus of the entire system. In addition, the Pinnell web assembly must be strong (and hence heavy).

There is, therefore, a need for apparatus that is light and simple and that enables each chute in the clustered parachute system to have symmetrically applied loading and also enables the simultaneous disreefing of a plurality of parachutes forming a clustered parachute system. Such a system should also be capable of effecting disreefing in stages, so as to avoid overloading of individual parachutes and permitting greater control on the rate of descent of a parachuted load.

SUMMARY OF THE INVENTION

Accordingly, it is an object of this invention to provide an improved apparatus for symmetrically loading and simultaneously disreefing all the parachutes in a clustered parachute system.

It is another object of this invention to provide an apparatus for simultaneous disreefing of all parachutes in a clustered parachute system after a predetermined time delay following initial deployment of the system.

It is a further object of this invention to provide light and simple apparatus for simultaneous deployment of all the parachutes in a clustered parachute assembly in successive stages timed for controlled descent.

These and other objects of this invention are realized by providing in a parachute assembly a cluster of parachutes, each connected by load lines to a payload. Each parachute is initially reefed in a manner to allow for symmetric loading and is attached at a single attachment point on its periphery to a disreefing means and hence to all the other parachutes. Following deployment of the clustered parachutes in a reefed state, the disreefing means is actuated to simultaneously disreef all parachutes and disconnect the disreefing means from all the parachutes in the cluster. In another aspect of the invention, a time delay is provided to delay the output of the actuation means and hence the simultaneous disreefing of all the parachutes in the cluster.

Still other objects and advantages of the present invention will become readily apparent to those skilled in this art from the following detailed description, wherein only the preferred embodiments of the invention are shown and described, simply by way of illustration of the best mode contemplated of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1 is a perspective view of a three-parachute cluster assembly in its reefed state, supporting a common payload.

FIG. 2 is an upwardly directed view of a three-parachute cluster in its reefed state, for a two stage disreefing system, with load lines removed for simplicity.

FIG. 2A is an enlarged view of the central portion of FIG. 2.

FIG. 3 is a partial enlargement, in schematic form, of the central portion of a clustered parachute assembly according to this invention, to illustrate a first disposition of a first set of reefing and tether lines.

FIG. 4 is a partial enlargement, in schematic form, of the central portion of a clustered parachute assembly according to this invention, to illustrate an alternative disposition of the first set of reefing and tether lines.

FIG. 5 is a partial perspective view of one embodiment of a lines cutting mechanism used in the invention.

FIGS. 6, 7, and 8, respectively, are plan, side, and end views of a double cutter assembly suitable for use according to this invention.

FIGS. 9 and 10, respectively, are side and end views of a single cutter suitable for use according to this invention.

FIGS. 11 and 12, respectively, are front and side elevation views of a deployed double cutter according to this invention.

DESCRIPTION OF THE PREFERRED EMBODIMENTS

As best seen in FIG. 1, shortly after it is dropped from an aircraft, a clustered parachute assembly 22 has individual parachutes 24 in a reefed state. Each parachute 24 has a skirt with a periphery 26 uniformly attached around its entire circumference by similar lines 28 to a common payload 30. This construction allows symmetric loading of each chute in the cluster.

In a line-reefed deployment state, as shown, a strong central line 32 is stretched between payload 30 and a central cutter 42. A number of loops 34 are typically spaced apart on central line 32 and frangible lines or ribbons (not shown) hold lines 28 close to central line 32 and the parachute system deployment bag during the initial stages of deployment. As the parachutes begin to deploy, the forces in load lines 28 are sufficient to break the lines or ribbons holding them to loops 34 and the deployment bag, and load lines 28 separate and locate themselves in order to support the payload 30.

At the periphery 26 of each parachute 24, preferably along its inner surface, a plurality of similar rings 36 is evenly distributed, with a reserved ring 38 located closest to the nominal center of the cluster 22. A first closed loop reefing line 39 is passed through all of the rings 36 and is also passed through cutter 42 (discussed more fully hereinafter). The length of each of the first reefing lines 39 is selected to be substantially less than the full length of each periphery 26, typically about one-third. As a consequence, prior to severance of first reefing line 36, each parachute in its reefed state presents a relatively small area to the air through which it is falling such that the loads are symmetrically applied to each parachute, and hence exerts a correspondingly small force on payload 30. Thus, in its reefed state, each individual parachute 24 is loaded symmetrically and well within its design capability.

A short closed loop tether line 40 passes through reserve ring 38 of each parachute and also passes through cutter 42. It should be understood that short tether lines 40 are the means by which cutter 42 is attached to each of the individual parachutes 24. Therefore, for a three-parachute cluster, as illustrated in FIG. 2, cutter 42 has passing through it three of the first reefing lines 39 and three of the first tether lines 40.

A second reefing line 44 (shown in dotted lines), if one is utilized, is preferably passed through each of the rings 36 receiving first reefing line 39. Likewise, second tether line 46 (dotted lines), for each parachute 24 in the cluster 22, passes through the corresponding reserved ring 38. Each of the second reefing lines 44 and second tether lines 46 is passed through a second cutter 43 and all of them are disposed to be simultaneously cut by the cutter when it is actuated. These details are best seen in FIG. 2A.

There are, of course, a number of ways in which the individual reefing lines 39 and 44 can be disposed between cutters 42, 43, and the individual parachutes 24. A first alternative is illustrated in FIG. 3 wherein, for the sake of simplicity, the lines for only one parachute are shown. First reefing line 39, identified by arrowheads, passes through a typical attachment ring 36 through the cutter 42 and back through another ring 36, bypassing reserved ring 38 entirely. First short tether line 40 passes through reserve ring 38 and through cutter 42. In practice, all other parachutes in the cluster are connected in the same way.

An alternative disposition of first reefing line 39 is shown in FIG. 4, again limited for simplicity to one of the cluster of parachutes. In this alternative, first reefing line 39 passes once through all the rings 36 and through reserve ring 38, then through cutter 42, back through ring 38 from the opposite side, and then through other rings 36. In other words, first reefing line 38 forms a figure eight that has its waist at reserve ring 38. This disposition of the first reefing line 39 makes for uniform force distribution applied by it to the parachute periphery 26 but may not be practical if the first reefing line is so thick that two thicknesses of it with the first tether line 40 make for a tight fit in the reserved ring 38. First tether line 40, as in the illustration of FIG. 3, simply passes through reserved ring 38 and cutter 42.

Referring to FIGS. 6–8, a conventional dual line cutter, such as Model No. 231822 by Technical Ordnance, Inc., St. Bonifacius, Minn., used in the invention has an elongated body and two actuator assemblies 54 disposed side by side at one end thereof. Actuation of each of two parallel cutting mechanisms is effected by the exertion of a pulling force by line 32 on each slidable element 56 which slides out to initiate the cutting process. The lines that are to be simultaneously cut by the cutter elements are passed through aperture 52 that extends laterally through the casing of cutter 42. Each of the two cutting blades 48 then has access to cut across all such lines.

Spring clips 58 (FIG. 8) retain sliding elements 56 within cutter actuation elements 54 during pre-deployment handling. Upon being recharged after a deployment and use, element 56 may be reconnected to cutter 42 through actuator 54.

If only single stage disreefing is desired, or where redundancy is not important, it may be sufficient to provide a conventional single cutter 70, such as Model No. 110211 also by Technical Ordnance, Inc., illustrated in FIGS. 9 and 10. Cutter 70, like cutter 42, has an opening 72 through which the various lines to be cut are disposed. Cutter casing 70 is provided with an end cap 73 attachable to the rest of casing 70 by means of screws 75 (FIG. 10). Thus, by removing cap 73, it becomes possible to place the various reefing and tether lines into open slot 72 which, upon replacement of cap 73, becomes an aperture 72. A base plate 74 is provided for attachment of cutter 70 to central line 32.

One technique for locating a dual cutter 42 at the end of line 32 is illustrated in FIGS. 11 and 12. A partially open pocket-like element 59 is provided at the end of line 32 to receive and hold dual cutter 42 therein. Pocket 59 prevents the cutter contained within it from becoming entangled with the various lines around and through it, particularly during deployment of the parachutes. Reefing lines 39 and tether lines 40 from the plurality of parachutes to be disreefed by cutter 42 are disposed as illustrated in FIG. 11. Closed loop lines 60 connect sliding cutter actuation elements 56 to a closed loop 62 attached to line 32. The lengths of lines 60 are equal and are selected to be such that when the cluster of parachutes 22 in its reefed state reaches a position where lines 28 are stretched, line 32 will exert a force through lines 60 on sliding actuator elements 56. At the same time, tether lines 40 will exert a force on the main body of cutter 42 in the opposite direction and, as a direct consequence thereof, sliding cutter actuation elements 56 will be pulled from elements 54 for actuating cutter element 42.

U.S. Pat. No. 3,452,631 to Brizzolara, entitled, "Reefing Line Cutter," discloses such an explosively actuated reefing line cutter, incorporated herein by reference. In principle, as best understood with reference to FIG. 5, an explosively generated force F moves a sharp knife-edged element 48, disposed across a plurality of reefing lines 39 and tether lines 40, toward a resisting anvil element 50. The action of the resisted force F is to drive the knife edge to simultaneously sever all the lines disposed between knife edge 48 and anvil 50.

As best seen with reference to FIG. 6, the typical dual reefing line cutter 42 includes a cutter body or outer housing, a knife element 48 to cut the reefing lines, explosive charges (not shown) to propel the knife element 48 through the cutting lines, a time delay (not shown) to allow the loads generated by the parachute on the load lines to stabilize, and sliding cutter actuation elements 56 starting or actuating the time delay. A mechanically-actuated device is typically used to initiate a pyrotechnic time delay, but an electrically initiated electronic time delay is also usable and may be preferred for some applications. In either case, the output of the time delay is used to fire the explosive and drive the knife element through the reefing lines to sever them.

Where multi-staged disreefing is desired, and the lines are deployed as indicated in FIG. 2, the force exerted by central line 32 should initiate a first time delay to allow the then reefed parachutes 24 to attain an initial measure of stability immediately preceding the first disreefing severance of the first reefing lines 39 and first tether lines 40 by the first cutting action of the line cutter. The second time delay is preferably initiated at the same instant as the first time delay, but must necessarily be longer to allow sufficient time for the first-disreefed parachutes to reach their first-disreefed stable state to be ready for the second disreefing action. Thus, the second disreefing lines 44 and second tether lines 46 will be simultaneously severed at a later time after the parachutes have attained a first disreefed stable configuration.

To further enhance the security of the system, and especially to ensure that all the reefing and tether lines that have to be severed simultaneously are in fact severed simultaneously and not sequentially, it may be desirable to use a double cutter 42 even for a single-stage disreefing system. Such redundancy of the cutting mechanism may be very valuable in certain applications, e.g., when clustered parachutes are used for "laydown" weapon delivery. It should be necessary, in such cases, to ensure that both cutting blades 48 in dual cutter 42 are actuated at the end of the same single time delay. Thus each of the reefing lines and tether lines will be cut simultaneously by two separate cutting edges. If both edges sever all the lines, all the parachutes will be disreefed simultaneously. If only one cutter severs all the lines, then again, all the parachutes will be disreefed simultaneously.

By a logical extension of this principle, to ensure safety for a multi-staged disreefing system, a user of this invention may wish to consider using dual cutters for each stage of the multi-stage disreefing process. Such modifications are considered to be well within the capabilities of persons skilled in the art and are intended to be comprehended within this invention.

The present invention has been particularly described in conjunction with the drawings attached hereto and with reference to the preferred embodiments thereof. However, it should be apparent to persons skilled in the art that other and further modifications may be made to the embodiments disclosed herein within the spirit and scope of this invention. All such modifications are intended to be comprehended within the invention defined by the claims appended below.

What is claimed is:

1. A parachute assembly for controlled dropping of a payload, comprising:
    a cluster of parachutes each having a canopy skirt with a periphery attached by load lines to the payload;
    reefing means for reefing each of said parachutes;
    disreefing means for disreefing all of said parachutes simultaneously;
    each said parachute having a reefing line disposed substantially along said periphery of said parachute and through said disreefing means;
    retaining means for retaining said disreefing means to a single point of attachment on the periphery of each parachute, said retaining means comprising tether lines each disposed between a corresponding parachute and said disreefing means;
    said disreefing means comprising line-cutting means to simultaneously cut all reefing and tether lines; and actuation means, connected to said payload, for actuating said disreefing means after deployment of said parachutes in a reefed state thereof to disreef all of said parachutes simultaneously and to disconnect said disreefing means from each of said parachutes.

2. A parachute assembly according to claim 1, further comprising:
time delay means for delaying an output of said actuation means.

3. A parachute assembly according to claim 2, wherein:
said time delay means comprises a pyrotechnic time delay means.

4. A parachute assembly according to claim 2, wherein:
said time delay means comprises an electronic time delay means.

5. A parachute assembly, comprising:
a cluster of parachutes, each attached by load lines to a common payload and having a plurality of attachment rings at its periphery;
each said parachute having a first closed loop reefing line passing through all except a reserved ring of said plurality of attachment rings and a first closed loop tether line passing through said reserved ring;
first cutter means attached to each of said parachutes by said first tether lines, said first reefing lines and said first tether lines all being disposed to be cut simultaneously upon actuation of said first cutter means for a first simultaneous disreefing and release of said parachutes; and
first actuator means for actuating said first cutter means.

6. A parachute assembly according to claim 5, wherein:
each of said parachutes has a similar size and shape.

7. A parachute assembly according to claim 6, wherein:
said first actuator means comprises a central line attached between said first cutter means and said payload, said central line having first and second ends and a length such that upon deployment of said clustered parachutes in a line-reefed state thereof, said central line actuates said first cutter means.

8. A parachute assembly according to claim 7, further comprising:
first time delay means for delaying an output of said first actuator means by a predetermined first time delay.

9. A parachute assembly according to claim 8, further comprising:
in each of said parachutes, a second closed loop reefing line that passes through all of the same rings as said first reefing line therein and a second short closed loop tether line passing through the same reserved ring as said first tether line;
second cutter means, located close to said first cutter means and attached to each of said parachutes by said second tether lines, said second reefing lines and said second tether lines all being disposed to be cut simultaneously upon actuation of said second cutter means for a second simultaneous disreefing and release of said parachutes, said second reefing lines each having a length longer than the length of the corresponding one of said first reefing lines but shorter than the fully disreefed length of the corresponding periphery, said second cutter means being attached adjacent said first end of said central line for actuation by an actuating force exerted thereby; and
said second cutter means further comprising second time delay means for delaying an output of said second cutter means by a second time delay that has a longer duration than said first time delay.

10. A parachute assembly according to claim 9, wherein:
said second time delay means comprises a mechanically initiated second pyrotechnic element to provide said second time delay.

11. A parachute assembly according to claim 9, wherein:
said second delay means comprises an electrically initiated second electronic time delay element to provide said second time delay.

12. A parachute assembly, comprising:
a cluster of parachutes, each attached by load lines to a common payload, and having a plurality of attachment rings at its periphery;
each said parachute having a first closed loop reefing line passing through all including a reserved ring of said plurality of attachment rings thereof, said closed loop reefing line making a figure eight form with the waist of such form being located at said reserved ring and a first short closed loop tether line passing through said reserved ring;
first cutter means, attached to each of said parachutes by said first tether lines, said first reefing lines and said first tether lines all being disposed to be cut simultaneously upon actuation of said first cutter means for a first disreefing and release of said parachutes; and
first actuation means for actuating said first cutter means.

13. A parachute assembly according to claim 12, wherein:
each of said parachutes has a similar size and shape.

14. A parachute assembly according to claim 13, wherein:
said first actuation means comprises a central line attached between said first cutter means and said payload, said central line having a length such that upon deployment of said clustered parachutes in a line-reefed state thereof, said central line actuates said first cutter means.

15. A parachute assembly according to claim 14, further comprising:
first time delay means for delaying an output of said first actuation means by a predetermined first time delay.

16. A parachute assembly according to claim 14, further comprising:
in each of said parachutes, a second closed loop reefing line that passes through all of the same rings in the same manner as said first reefing line therein; and a second short closed loop tether line passing through the same reserved ring as said first tether line;
second cutter means, located close to said first cutter means and attached to each of said parachutes by said second tether lines, said second reefing lines and said second tether lines all being disposed to be cut simultaneously upon actuation of said second cutter means for a second simultaneous disreefing and release of said parachutes said second reefing lines each having a length longer than the length of the corresponding one of said first reefing lines but shorter than the fully disreefed length of the corresponding periphery, said second cutter means being attached adjacent a first end of said central line for actuation by an actuating force exerted thereby; and
said second cutter means further comprising second time delay means for delaying an output of said second cutter means by a second time delay that has a longer duration than a predetermined first time delay.

* * * * *